(12) United States Patent
Ichimura

(10) Patent No.: US 11,347,026 B2
(45) Date of Patent: May 31, 2022

(54) IMAGING OPTICAL SYSTEM AND IMAGE PROJECTION APPARATUS

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 340 days.

(21) Appl. No.: 16/257,883

(22) Filed: Jan. 25, 2019

(65) Prior Publication Data
US 2019/0235206 A1  Aug. 1, 2019

(30) Foreign Application Priority Data

Jan. 29, 2018 (JP) .............. JP2018-012817

(51) Int. Cl.
*G02B 9/12* (2006.01)
*G02B 27/00* (2006.01)
*G03B 21/14* (2006.01)
*H04N 5/225* (2006.01)

(52) U.S. Cl.
CPC .......... *G02B 9/12* (2013.01); *G02B 27/0025* (2013.01); *G03B 21/142* (2013.01); *H04N 5/2254* (2013.01)

(58) Field of Classification Search
CPC .......... G03B 3/00; G03B 17/54; G03B 21/00; G03B 21/005; G03B 21/134; G03B 21/14; G03B 21/142; G03B 21/53; G03B 21/64; G03B 21/147; G03B 21/28; G03B 24/64; G02B 7/04; G02B 7/10; G02B 9/00; G02B 9/12; G02B 9/34; G02B 13/00; G02B 13/02; G02B 15/14; G02B 15/1451; G02B 27/00; G02B 27/0025; G02B 27/40; G02B 13/16; G02B 13/18; H04N 5/00; H04N 5/222; H04N 5/225; H04N 5/2251; H04N 5/2254; H04N 5/23212
USPC ............ 396/430, 77–83, 89–152; 348/333.1, 348/345–357; 349/5–10, 353; 250/201.2–201.8; 352/139, 140; 359/434, 642, 649, 682, 696, 698, 754, 359/771, 784; 382/255; 353/101
See application file for complete search history.

(56) References Cited

U.S. PATENT DOCUMENTS

| | | | |
|---|---|---|---|
| 9,784,951 B2 | 10/2017 | Ichimura | |
| 9,785,043 B2 | 10/2017 | Matsuo | |
| 9,910,251 B2 | 3/2018 | Oe | |

(Continued)

FOREIGN PATENT DOCUMENTS

| | | | |
|---|---|---|---|
| JP | H0527345 A | 2/1993 | |
| JP | 2011017984 A | 1/2011 | |
| JP | 2015152764 A | 8/2015 | |

*Primary Examiner* — Jie Lei
(74) *Attorney, Agent, or Firm* — Carter, DeLuca & Farrell LLP

(57) ABSTRACT

An imaging optical system includes, in order from an enlargement conjugate side to a reduction conjugate side, a first lens unit having a positive refractive power, a second lens unit having a positive refractive power, and a third lens unit. A distance between adjacent lens units varies in focusing from a far side to a near side. An intermediate image is formed inside the second lens unit. In focusing from the far side to the near side, the second lens unit moves to the reduction conjugate side, and the third lens unit moves to the enlargement conjugate side.

7 Claims, 10 Drawing Sheets

(56) References Cited

U.S. PATENT DOCUMENTS

| | | |
|---|---|---|
| 10,139,606 B2 | 11/2018 | Ichimura |
| 2014/0036142 A1* | 2/2014 | Inoko .................... G02B 13/22 |
| | | 348/369 |
| 2019/0079305 A1 | 3/2019 | Ichimura |
| 2020/0241400 A1* | 7/2020 | Yoshida ................ G03B 21/28 |

* cited by examiner

IMAGING OPTICAL SYSTEM AND IMAGE PROJECTION APPARATUS

BACKGROUND OF THE INVENTION

Field of the Invention

The present invention relates to an imaging optical system used as a projection optical system for an image projection apparatus (projector) etc.

Description of the Related Art

A projector needs a projection optical system (projection lens) having a wide angle of view and a high resolving power. Japanese Patent Laid-Open No. ("JP") 05-027345 discloses a projection lens that forms an internal intermediate image for a wide angle of view.

The high resolution scheme needs a reduced fluctuation in the image plane flatness with the projection distance as well as a higher image plane flatness. JP 2011-017984 discloses a projection lens that moves a lens unit on a reduction conjugate side of an internal intermediate image for focusing. JP 2015-152764 discloses a projection lens that includes a lens unit configured to form an internal intermediate image and two lens units disposed on reduction and enlargement conjugate sides of the lens unit and moves these lens units to the reduction conjugate side for focusing.

However, the projection lens that forms an internal intermediate image as disclosed in JPs 05-027345, 2011-017984, and 2015-152764 is likely to have a higher power of each lens unit and causes the resolving power to lower due to slight changes in distance between the lens units and eccentricity (decentering).

SUMMARY OF THE INVENTION

The present invention provides an imaging optical system having a high resolving power, a wide angle of view, and a good imaging performance from a far side to a near side.

An imaging optical system according to one aspect of the present invention includes, in order from an enlargement conjugate side to a reduction conjugate side, a first lens unit having a positive refractive power, a second lens unit having a positive refractive power, and a third lens unit. A distance between adjacent lens units varies in focusing from a far side to a near side. An intermediate image is formed inside the second lens unit. In focusing from the far side to the near side, the second lens unit moves to the reduction conjugate side, and the third lens unit moves to the enlargement conjugate side.

An image projection apparatus according to another aspect of the present invention includes the above imaging optical system, a light modulation element disposed on the reduction conjugate side of the imaging optical system. The imaging optical system is a projection optical system configured to form light from the reduction conjugate side onto a surface on the enlargement conjugate side.

Further features of the present invention will become apparent from the following description of exemplary embodiments with reference to the attached drawings.

DESCRIPTION OF THE EMBODIMENTS

Figure 1:
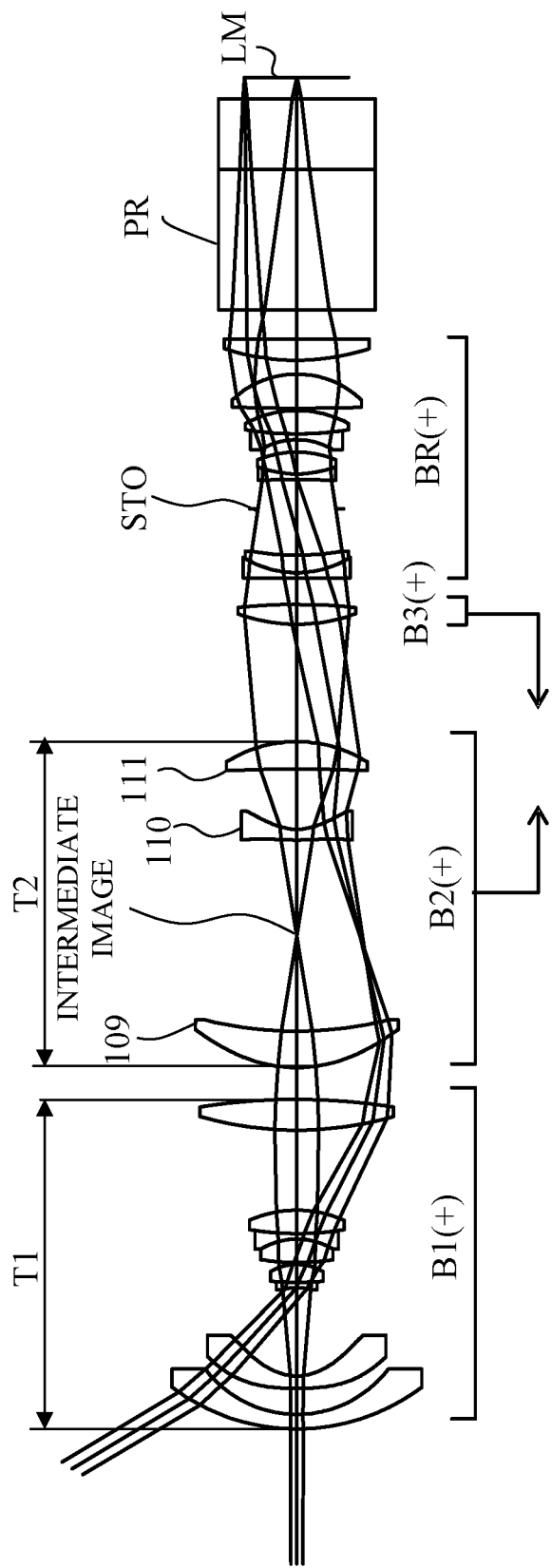
FIG. 1 is a sectional view of an imaging optical system according to example 1 of the present invention.

Referring now to the accompanying drawings, a description will be given of embodiments according to the present invention. First, prior to the description of specific examples (numerical examples), matters common to the respective examples will be described.

An imaging optical system according to this embodiment includes a wide-angle lens which forms an enlarged image based on light incident from the reduction conjugate side, onto a surface on the enlargement conjugate side. The imaging optical system includes, in order from the enlargement conjugate side to the reduction conjugate side, a first lens unit having a positive refractive power, a second lens unit having a positive refractive power, and a third lens unit. The second lens unit forms an intermediate image in the second lens unit. In focusing from a far side to a near side, the second lens unit moves to the reduction conjugate side, and the third lens unit moves to the enlargement conjugate side. At this time, the first lens unit and the last lens unit (fourth or fifth lens unit) do not move (or are fixed).

The first lens unit serves as a wide-angle lens unit configured to enlarge and project the intermediate image formed inside the second lens unit onto a projection surface on the enlargement conjugate side. The second lens unit serves as a field lens unit that forms an intermediate image inside the second lens unit as described above and deflects a peripheral light flux. Deflecting the peripheral light flux, as used herein, means moderately refracting the light flux, reversing the optical path or changing the direction of the light flux. The lens unit following the third lens unit serves as a relay lens unit configured to guide light from the original image on the reduction conjugate side, to the second lens unit.

The second lens unit that forms the intermediate image is advantageous in aberrational correction when an angle of the light ray is abruptly changed before and after the intermediate image. However, the aberrational change becomes significantly when the position of the second lens unit changes minutely. Hence, the embodiment sets sufficiently large the thickness of the second lens unit from the enlargement conjugate side to the reduction conjugate side (or in the optical axis direction in which the optical axis of the imaging optical system extends), and relaxes a limitation of the refraction angle of the light flux. This configuration improves the aberration correcting performance of the second lens unit while improving the stability of the aberration correcting performance against minute positional changes.

Herein, the "thickness" of the lens unit is a distance on the optical axis between the surface of the lens unit closest to the enlargement conjugate side and the lens surface closest to the reduction conjugate side. Improving the stability of the aberration correcting performance means that the aberration correcting performance is less likely to deteriorate due to the eccentricity of the lens or a change in the interval.

The embodiment may satisfy the following condition (1), where T1 is a thickness of the first lens unit and T2 is a thickness of the second lens unit. This embodiment may further satisfy the following condition (1a) or (1b).

$$0.4 \leq T2/T1 \leq 2.0 \quad (1)$$

$$0.6 \leq T2/T1 \leq 1.8 \quad (1a)$$

$$0.8 \leq T2/T1 \leq 1.2 \quad (1b)$$

Since the curvature of field significantly changes as the projection distance changes in focusing from the far side to the near side in the wide-angle lens, it is important to correct the fluctuation of the focus position on the optical axis as well as the curvature of field according to the projection distance.

The second lens unit as a field lens unit has a characteristic in that the focus position on the optical axis is unlikely to change in its movement and the curvature of field is significantly changed. Hence, a configuration may be employed that adjusts the curvature of field by moving the second lens unit in focusing. A so-called floating focus may be employed that moves part of the relay lens unit in addition to the second lens unit to change the focus position on the optical axis so as to provide a high image plane flatness from the far side to the near side.

The second lens unit may move to the reduction conjugate side in focusing from the far side to the near side. This configuration can successfully correct the curvature of field on the overshoot side as the projection distance changes.

The second lens unit may include an aspherical lens (aspheric positive lens) having a positive refractive power which has a convex surface on the enlargement conjugate side disposed on the enlargement conjugate side of the intermediate image that is easy to separate an off-axis light ray, and an aspherical lens (aspheric negative lens) having a negative refractive power and a positive lens having a convex surface on the reduction conjugate side, which are disposed on the reduction conjugate of the intermediate image. This configuration can easily obtain the good image plane flatness from the intermediate image height to the peripheral image height, and maintain a high image plane flatness in focusing.

As described above, when a negative lens (aspherical negative lens) is disposed on the reduction conjugate side of the intermediate image, the curvature of field can be successfully corrected on the undershoot side in the wide-angle lens unit on the enlargement conjugate side of the intermediate image. However, when the surface of the negative lens contacting (facing) the intermediate image has an excessively small radius of curvature, the peripheral light flux on the negative lens has a high incident angle and the stability of the curvature of field correcting performance lowers. When the curvature of curvature is overcorrected and the peripheral light flux diverges, a lens diameter of the relay lens unit increases. The lowered stability of the curvature of curvature correcting performance, as used herein, means that the lowered stability of the curvature of curvature correcting performance easily caused by the eccentricity or the interval changes in the lens.

This embodiment makes a shape of the negative lens on the reduction conjugate side of the intermediate image strong concave on the reduction conjugate side, and improves the stability of the curvature of curvature correcting performance. More specifically, this embodiment may satisfy a condition expressed by the following expression (2) where r1 is a radius of curvature of the lens surface of the negative lens on the enlargement conjugate side, r2 is a radius of curvature of the lens surface of the negative lens on the reduction conjugate side, and $sf=(r1+r2)/(r1-r2)$:

$$0 < sf \leq 3 \quad (2)$$

The aberration in the first lens unit is likely to change in the movement because the light flux is incident from the first surface on the enlargement conjugate side at a steep angle. Hence, the first lens unit is fixed in focusing for the stability of the aberration. Since the telecentricity of the final lens unit is likely to change in its movement, the final lens unit is fixed in focusing.

The light flux is incident from the first surface on the enlargement conjugate side at a steep angle when the light from an object enters the first lens unit when the imaging optical system according to this embodiment is used as the image capturing optical system. Of course, the imaging optical system according to this embodiment may be used as a projection optical system, and the light from the liquid crystal panel may be emitted from the first lens unit.

An upper limit value in the conditional expression (2) may be changed as shown in the following expression (2a) or (2b).

$$0 < sf \leq 2.0 \quad (2a)$$

$$0.3 < sf \leq 1.5 \quad (2b)$$

When the second lens unit as the field lens unit tilts integrally relative to the optical axis, an aberrational change on the enlargement conjugate side of the intermediate image and an aberrational change on the reduction conjugate side of the intermediate image are added to each other. Hence, the second lens unit may include a 2A-th lens unit on the enlargement conjugate side of the intermediate image and a 2B-th lens unit on the reduction conjugate side of the intermediate image. Since the inclination centers are different from each other when the inclinations of the 2A-th lens unit and the 2B-th lens unit change, the addition of aberrational changes is relaxed and the stability of the aberration improves. The 2A-th lens unit and the 2B-th lens unit may be moved on the same trajectory or independently (so as to change their interval or distance). Since the second lens unit serves as a field lens unit as described above, both lens units may move to the reduction conjugate side in focusing from the far side to the near side.

When the third lens unit has a positive refractive power and moves to the enlargement conjugate side in focusing from the far side to a near side, the curvature of field does not significantly change, and a movement to the enlargement conjugate side can correct an on-axis movement of the focus position on the overshoot side. The third lens unit has little influence on the peripheral light flux and can form a single positive lens.

Specific examples will be described below.

Example 1

FIG. 1 illustrates a section of an imaging optical system according to example 1 (numerical example 1). FIG. 1 also illustrates a light modulation element LM as an element in the image projection apparatus and an optical element PR such as a prism. The light modulation element LM modulates light from an illustrated light source according to the image signal input to the image projection apparatus. The optical element PR guides the light modulated by the light modulation element LM to the imaging optical system (projection lens). The light modulation element LM and the optical element PR are also illustrated in other examples which will be described later.

Figure 2A:
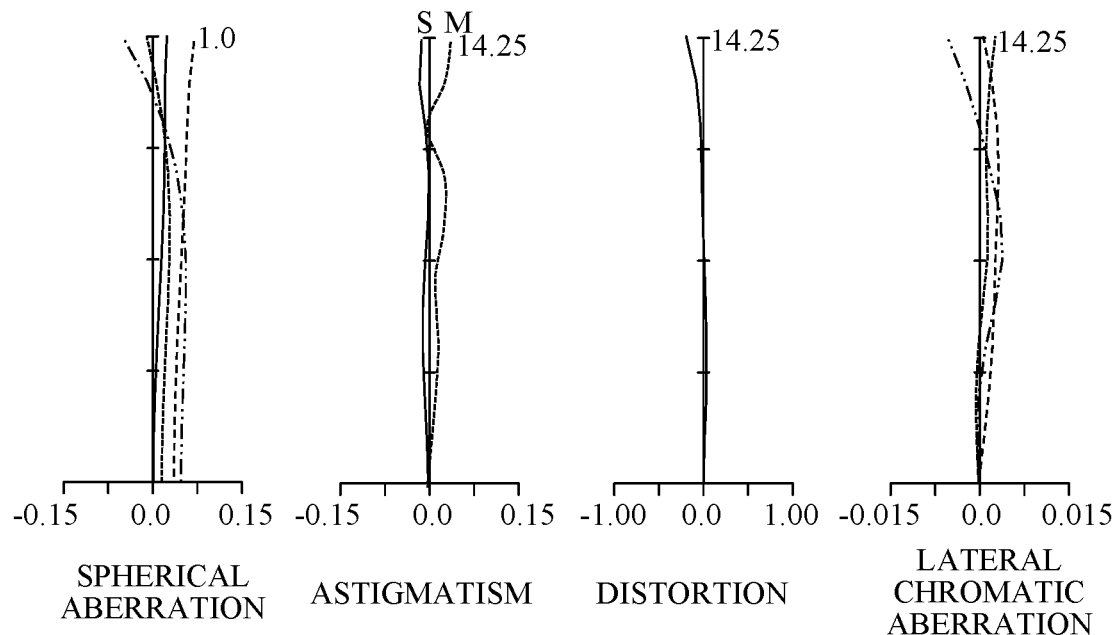
FIGS. 2A and 2B are aberration diagrams of the imaging optical system according to example 1.
Figure 2B:
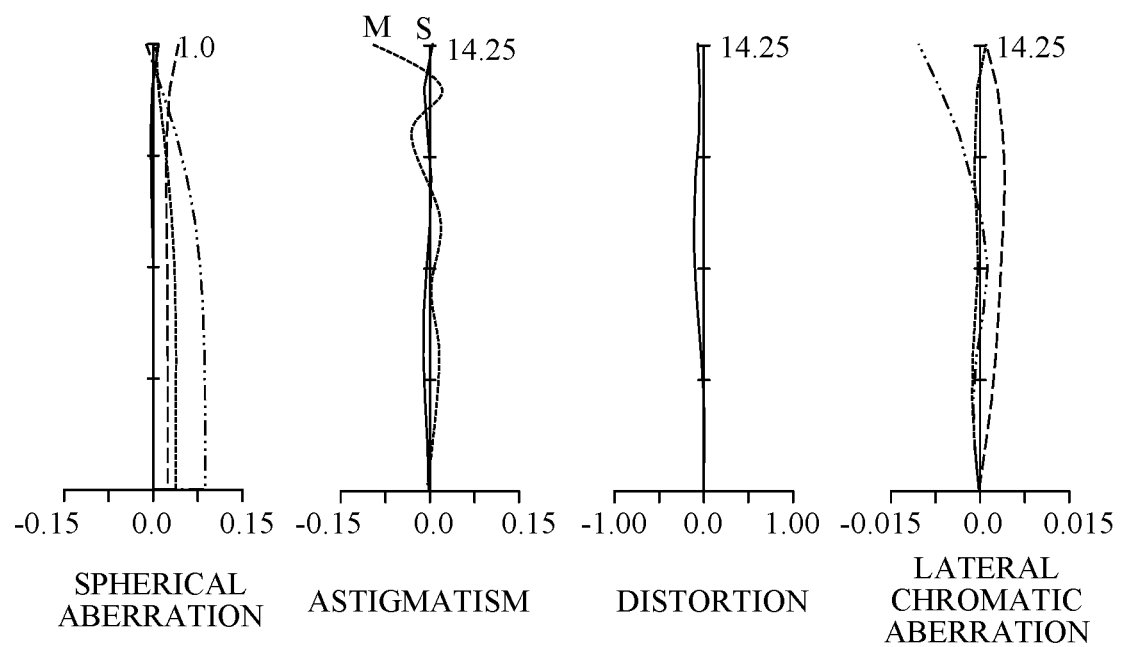

Table 1 shows numerical values of the imaging optical system according to this example. FIGS. 2A and 2B illustrate a variety of aberrations (spherical aberration, curvature of field, distortion, and lateral chromatic aberration (chromatic aberration of magnification)) representing the imaging performance when the imaging optical system according to this example focuses on the far side and the near side, respectively.

The imaging optical system according to this example is used for a projection lens having a wide angle of view, such as a half angle of view of about 59°, and as bright as an F-number of about 2.4. The imaging optical system according to this example includes a first lens unit B1 that is positive and fixed in focusing, a second lens unit B2 that is positive, serves as a field lens unit, and moves in focusing, and a third lens unit B3 that moves in focusing. The imaging optical system further includes a fourth lens unit (final lens unit) BR fixed in focusing. The fourth lens unit BR includes a diaphragm (aperture stop) STO.

In the imaging optical system according to this example, the second lens unit B2 moves to the reduction conjugate side and the third lens unit B3 moves to the enlargement conjugate side in focusing from the far side to the near side.

The second lens unit B2 according to this example has a configuration that has a significant change in curvature of field caused along with its movement and does not significantly change the focus position on the optical axis. On the other hand, the third lens unit B3 has a configuration that has a small change in curvature of field caused along with its movement and significantly changes the focus position on the optical axis. This configuration realizes the floating focus that can independently adjust the focus position on the optical axis and the curvature of field.

The second lens unit B2 and the third lens unit B3 have a relationship of mutually canceling the spherical aberrations. This configuration can sufficiently reduce the aberrational fluctuation in focusing from the far side to the near side, as illustrated in FIGS. 2A and 2B.

This embodiment sets to be large the thickness of the second lens unit B2 serving as the field lens unit configured to significantly refract the peripheral light flux (the distance from the lens surface of the lens 109 on the enlargement conjugate side and the lens surface of the lens 111 on the reduction conjugate side). This configuration avoids abrupt angular changes of the light flux, and improves the stability of the aberration correcting performance.

The negative lens 110 located on the reduction conjugate side of the intermediate image in the second lens unit B2 can well correct the curvature of field in the first lens unit B1. The lens surface of the negative lens 110 on the reduction conjugate side having a strong curvature can suppress the abrupt curving of the light flux.

The second lens unit B2 provides an aspheric surface to each of the lens 109 on the enlargement conjugate side of the intermediate image and the lens 110 on the reduction conjugate side of the intermediate image. Since light fluxes are likely to separate for each image height near the intermediate image, the aspherical surface can reduce the difference in curvature of field for each image height and a change in curvature of field in focusing.

When the position of the intermediate image inside the second lens unit B2 is sufficiently separated from the lens in the second lens unit B2 or its vicinity, the image quality degradation is less likely to occur due to the internal distortion of the dust or the lens (glass).

In Table 1, |f| is a reference focal length (mm), F is an F-number, φ is a diameter (mm) of an image circle formed on the liquid crystal panel, and ω is a half angle of view)(°).

B is a number assigned to the lens units in order from the enlargement conjugate side to the reduction conjugate side. S is a surface number affixed to a lens surface from the enlargement conjugate side to the reduction conjugate side, EA is an effective diameter (mm) of each lens surface, R is a radius of curvature (mm) of each lens surface, and d is a distance or interval (mm) between adjacent lens surfaces. nd and vd are a refractive index and an Abbe number for the d-line (587.56 nm) of the lens glass material. OBJ denotes an enlargement side conjugate plane (projection plane), and IMG denotes an original image (light modulation element).

A lens surface with s on the right side of the surface number indicates the position of the diaphragm STO. A lens surface with an asterisk (*) on the right side of the surface number has an aspherical shape according to the following function, and Table 1 shows aspheric coefficients (r, K, A, B, C, D, E, and F). y represents a coordinate in the radial direction based on the surface vertex of the lens surface and x represents a coordinate in the optical axis direction based on the surface vertex.

$$x=(y^2/r)/[1+\{1-(1+K)(y^2/r^2)\}^{1/2}]+Ay^4+By^6+Cy^8+Dy^{10}+Ey^{12}+Fy^{14}$$

In the spherical aberration diagrams illustrated in FIGS. 2A and 2B, a solid line denotes the spherical aberration for the d-line (587.6 nm), a dotted line denotes the spherical aberration for the f-line (486.1 nm), a broken line denotes the spherical aberration for the C-line (656.3 nm), and an alternate long and two short dashed line denotes the spherical aberration for the g-line (435.8 nm), respectively. The scale on the abscissa axis is a defocus amount between −0.15 to +0.15 [mm]. In the radius of curvature diagram, a solid line indicates the radius of curvature on a sagittal image surface, and a dotted line indicates the curvature of field on a meridional image surface. The abscissa axis is the same as that of the spherical aberration diagram. In the distortion diagram, the scale on the abscissa axis is indicated by −1 to +1 [%]. The lateral chromatic aberration is indicated by −0.020 to 0.020 [mm]. The description of the notation relating to FIGS. 2A and 2B are the same as that in each of other examples which will be described later.

TABLE 1

NUMERICAL EXAMPLE 1
|f| = 8.51 F = 2.40 φ = 28.50 ω = 59.2

| B | S | EA | R | d | glass | nd | vd |
|---|---|---|---|---|---|---|---|
|   | OBJ |   |   | 814.00000 |   |   |   |
| 1 | 1 | 64.68 | 56.3554 | 4.0000 | SLAL12 | 1.67790 | 55.34 |
|   | 2 | 49.98 | 31.2050 | 7.1000 |   |   |   |
|   | 3* | 45.80 | 78.5644 | 3.5000 | LBAL42 | 1.58313 | 59.38 |
|   | 4* | 33.71 | 13.4435 | 24.2000 |   |   |   |
|   | 5 | 8.55 | −16.7984 | 1.5000 | FDS90SG | 1.84666 | 23.78 |
|   | 6 | 10.06 | 71.6405 | 5.0000 | PCD51 | 1.59349 | 67.00 |
|   | 7 | 13.09 | −13.7363 | 0.5000 |   |   |   |

TABLE 1-continued

NUMERICAL EXAMPLE 1
|f| = 8.51  F = 2.40  φ = 28.50  ω = 59.2

|   |     |       |           |         |         |         |       |
|---|-----|-------|-----------|---------|---------|---------|-------|
|   | 8   | 15.86 | 66.1095   | 6.5000  | PCD51   | 1.59349 | 67.00 |
|   | 9   | 17.95 | −18.6660  | 1.4000  | FDS90SG | 1.84666 | 23.78 |
|   | 10  | 20.78 | 71.4182   | 6.5000  | PCD51   | 1.59349 | 67.00 |
|   | 11  | 23.59 | −31.0369  | 22.0000 |         |         |       |
|   | 12  | 49.18 | 93.2048   | 8.5000  | SNPH1W  | 1.80809 | 22.76 |
|   | 13  | 49.83 | −163.9735 | 8.7384  |         |         |       |
| 2 | 14* | 52.17 | 36.2830   | 10.0000 | TAFD25  | 1.90366 | 31.31 |
|   | 15  | 49.96 | 100.7872  | 52.6500 |         |         |       |
|   | 16* | 27.88 | 77.6926   | 3.0000  | LBAL42  | 1.58313 | 59.38 |
|   | 17* | 27.17 | 14.1781   | 16.6000 |         |         |       |
|   | 18  | 34.41 | −314.3393 | 7.5000  | SLAH55V | 1.83481 | 42.72 |
|   | 19  | 35.72 | −35.8417  | 32.3048 |         |         |       |
| 3 | 20  | 29.89 | 46.3412   | 5.5000  | SFSL5   | 1.48749 | 70.24 |
|   | 21  | 29.37 | −153.2806 | 7.2068  |         |         |       |
| 4 | 22  | 26.87 | 551.6416  | 1.5000  | SFSL5   | 1.48749 | 70.24 |
|   | 23  | 25.90 | 27.3601   | 4.8000  | SNPH1W  | 1.80809 | 22.76 |
|   | 24  | 24.96 | 69.1086   | 12.9000 |         |         |       |
|   | s25 | 21.24 | 1e+018    | 8.0000  |         |         |       |
|   | 26  | 19.13 | −218.1221 | 1.5000  | FDS90SG | 1.84666 | 23.78 |
|   | 27  | 19.03 | 29.2867   | 6.0000  | SFSL5   | 1.48749 | 70.24 |
|   | 28  | 19.53 | −27.3685  | 3.5000  |         |         |       |
|   | 29  | 19.57 | −18.4841  | 1.5000  | TAFD25  | 1.90366 | 31.31 |
|   | 30  | 23.14 | 86.6773   | 6.5000  | SBSL7   | 1.51633 | 64.14 |
|   | 31  | 26.01 | −28.7807  | 0.5000  |         |         |       |
|   | 32  | 30.53 | 369.8007  | 9.5000  | SFPL55  | 1.43875 | 94.66 |
|   | 33  | 32.75 | −25.2545  | 3.8000  |         |         |       |
|   | 34  | 36.93 | 62.2259   | 5.8000  | SLAH66  | 1.77250 | 49.60 |
|   | 35  | 36.65 | 1e+013    | 8.0600  |         |         |       |
| 5 | 36  | 40.00 | 1e+018    | 38.7000 | HK9L    | 1.51680 | 64.21 |
|   | 37  | 40.00 | 1e+018    | 19.5000 | PBH56   | 1.84139 | 24.56 |
|   | 38  | 40.00 | 1e+018    | 5.8500  |         |         |       |
|   | IMG |       |           |         |         |         |       |

Aspheric data surface 3 r = 7.85644e+001  K = 0.00000e+000  A = 2.23482e−005  B = −2.84117e−008
C = 3.84260e−011  D = −2.47414e−014  E = 4.53056e−030  F = 0.00000e+000
surface 4 r = 1.34435e+001  K = −5.84328e−001  A = −4.57376e−005  B = 1.85652e−007
C = −6.68736e−010  D = 2.49098e−013  E = −5.05699e−031  F = 0.00000e+000
surface 14 r = 3.62830e+001  K = 0.00000e+000  A = −2.80744e−006  B = −3.10707e−010
C = −1.83015e−012  D = 1.45035e−015  E = −1.30506e−018  F = 0.00000e+000
surface 16 r = 7.76926e+001  K = 0.00000e+000  A = −4.24838e−005  B = 7.20396e−008
C = −1.15539e−010  D = 1.40383e−013  E = −1.57095e−033  F = 0.00000e+000
surface 17 r = 1.41781e+001  K = −4.28203e−001  A = −8.67428e−005  B = 3.23464e−008
C = 1.17289e−010  D = −8.48144e−013  E = −1.42200e−031  F = 0.00000e+000

Various data

| Projection distance | Reference | Near    | Far      |
|---------------------|-----------|---------|----------|
| Focal length [mm]   | 8.51      | 8.65    | 8.35     |
| F-number            | 2.40      | 2.40    | 2.40     |
| Angle of view       | 59.15     | 58.73   | 59.64    |
| Image height        | 14.25     | 14.25   | 14.25    |
| Overall length      | 372.11    | 372.13  | 372.10   |
| d 0                 | 814.000   | 465.000 | 3489.000 |
| d13                 | 8.738     | 9.466   | 7.902    |
| d19                 | 32.305    | 30.873  | 33.950   |
| d21                 | 7.207     | 7.910   | 6.399    |

|    | Start | End | Focal length [mm] |
|----|-------|-----|-------------------|
| B1 | 1     | 13  | 25.4544           |
| B2 | 14    | 19  | 104.7337          |
| B3 | 20    | 21  | 73.6580           |
| B4 | 22    | 35  | 59.9260           |

Example 2

Figure 3:
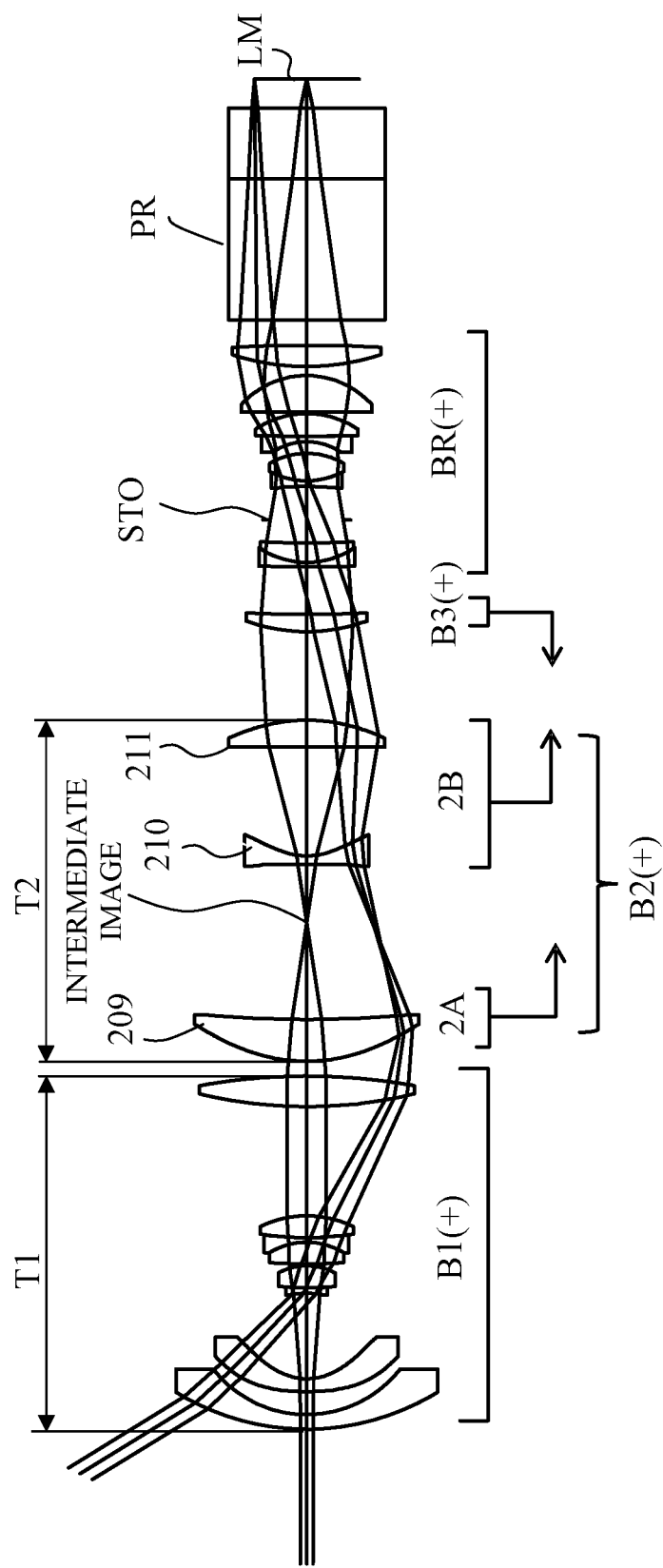
FIG. 3 is a sectional view of an imaging optical system according to example 2 of the present invention.
Figure 4A:
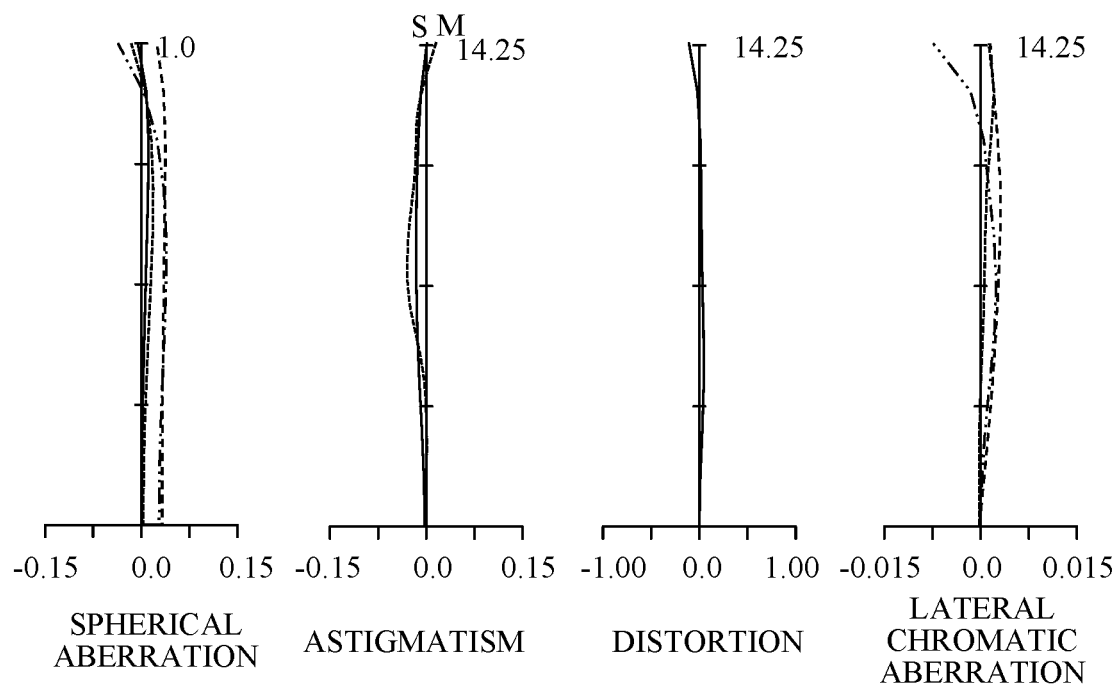
FIGS. 4A and 4B are aberration diagrams of the imaging optical system according to example 2.
Figure 4B:
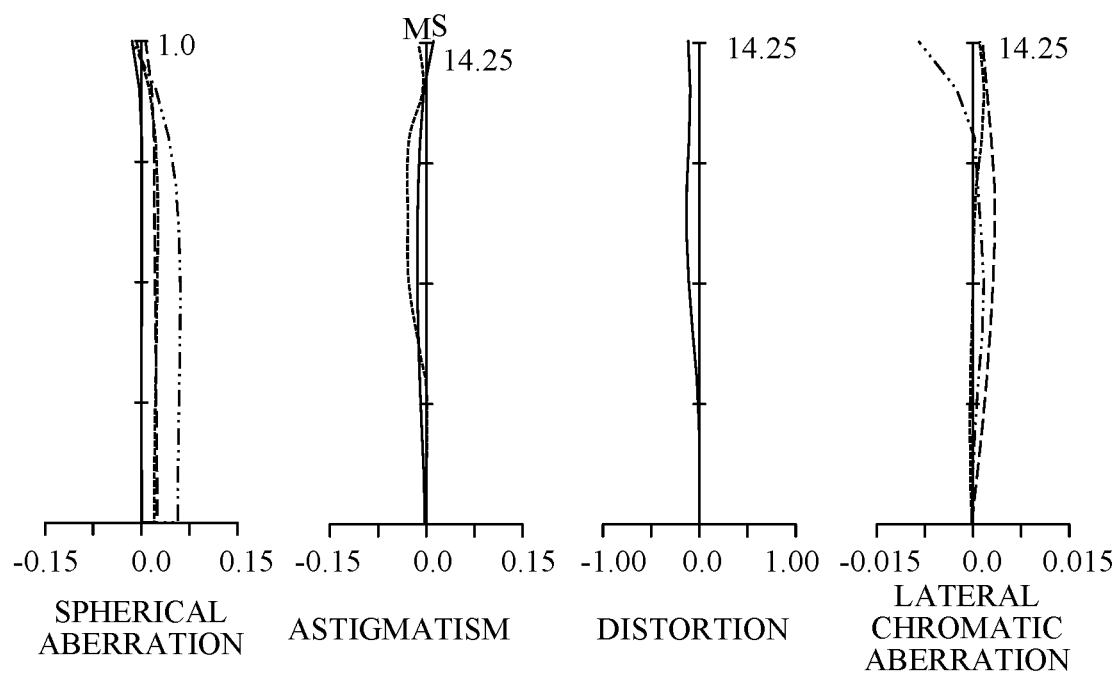

FIG. 3 illustrates a section of an imaging optical system according to example 2 (numerical example 2). Table 2 shows a variety of numerical values in the imaging optical system according to this example. FIGS. 4A and 4B illustrate a variety of aberrations showing the imaging performance when the imaging optical system according to this example focuses on a far side and a near side, respectively.

The imaging optical system according to this example is used for a projection lens having a wide angle of view, such as a half angle of view of about 58°, and as bright as an F-number of about 2.4. The imaging optical system according to this example includes a first lens unit B1 that is positive and fixed in focusing, a second lens unit B2 that is positive and moves in focusing, and a third lens unit B3 that moves in focusing. The imaging optical system further includes a fourth lens unit (final lens unit) BR fixed in focusing. The fourth lens unit BR includes a diaphragm STO.

In the imaging optical system according to this example, the second lens unit B2 moves to the reduction conjugate side and the third lens unit B3 moves to the enlargement conjugate side in focusing from the far side to the near side.

However, in the second lens unit B2, the 2A-th lens unit on the enlargement conjugate side of the intermediate image and the 2B-th lens unit on the reduction conjugate side of the intermediate image independently move to the reduction conjugate side.

Since the second lens unit B2 moves integrally in focusing in the example 1, when the second lens unit B2 tilts (decenters) around one tilt center, an aberrational change on the enlargement conjugate side of the intermediate image and the aberrational change on the reduction conjugate side of the intermediate image are added to each other. On the other hand, since the tilt centers of the 2A-th lens unit and the 2B-th lens unit are different from each other in this embodiment, an addition of aberrational changes is relaxed.

The 2A-th lens unit and the 2B-th lens unit have a relationship in which movements of the focus positions on the optical axis and the spherical aberrations cancel each other as they move in the optical axis direction. Therefore, when the 2A-th lens unit and the 2B-th lens unit are moved in the same direction (to the reduction conjugate side) without significantly changing the distance between them, the curvature of field may be controlled independently. This embodiment moves the 2A-th lens unit and the 2B-th lens unit while slightly changing the distance between them so as to increase the design freedom.

TABLE 2

NUMERICAL EXAMPLE 2
$|f| = 8.78 \ F = 2.40 \ \varphi = 28.50 \ \omega = 58.4$

| B | S | EA | R | d | glass | nd | vd |
|---|---|---|---|---|---|---|---|
|  | OBJ |  |  | 840.00000 |  |  |  |
| 1 | 1 | 67.79 | 67.4794 | 4.0000 | SBSL7 | 1.51633 | 64.14 |
|  | 2 | 50.98 | 32.1594 | 6.3094 |  |  |  |
|  | 3* | 46.86 | 63.7994 | 3.5000 | LBAL42 | 1.58313 | 59.38 |
|  | 4* | 35.38 | 14.4160 | 23.5755 |  |  |  |
|  | 5 | 9.04 | −18.5478 | 1.5000 | FDS90SG | 1.84666 | 23.78 |
|  | 6 | 10.33 | 113.1304 | 6.0000 | PCD4 | 1.61800 | 63.39 |
|  | 7 | 13.89 | −16.0612 | 0.5000 |  |  |  |
|  | 8 | 16.37 | 114.3355 | 6.0000 | PCD4 | 1.61800 | 63.39 |
|  | 9 | 18.33 | −18.7162 | 1.2000 | FDS90SG | 1.84666 | 23.78 |
|  | 10 | 21.13 | 81.0482 | 6.0000 | PCD4 | 1.61800 | 63.39 |
|  | 11 | 23.44 | −28.8496 | 30.0617 |  |  |  |
|  | 12 | 54.64 | 125.5471 | 8.4000 | SNPH1 | 1.80809 | 22.76 |
|  | 13 | 55.38 | −161.6460 | 4.0657 |  |  |  |
| 2 | 14* | 57.75 | 44.5676 | 11.5000 | TAFD25 | 1.90366 | 31.31 |
|  | 15 | 56.00 | 303.8072 | 42.6404 |  |  |  |
| 3 | 16* | 31.37 | 1057.1817 | 2.3000 | LBAL42 | 1.58313 | 59.38 |
|  | 17* | 30.12 | 16.2945 | 30.1193 |  |  |  |
|  | 18 | 39.10 | −1616.0801 | 7.2000 | SLAH55V | 1.83481 | 42.72 |
|  | 19* | 39.79 | −46.5320 | 24.4084 |  |  |  |
| 4 | 20 | 30.59 | 48.8448 | 4.7000 | SFPM3 | 1.53775 | 74.70 |
|  | 21 | 29.58 | 388.9582 | 13.1380 |  |  |  |
| 5 | 22 | 24.07 | 1357.8956 | 1.2000 | PCD51 | 1.59349 | 67.00 |
|  | 23 | 23.21 | 23.1051 | 5.3000 | FDS90SG | 1.84666 | 23.78 |
|  | 24 | 22.41 | 176.0875 | 6.3365 |  |  |  |
|  | s25 | 19.89 | 1e+018 | 9.2860 |  |  |  |
|  | 26 | 17.31 | −68.8551 | 1.5000 | FDS90SG | 1.84666 | 23.78 |
|  | 27 | 17.37 | 20.6708 | 7.5000 | SFSL5 | 1.48749 | 70.24 |
|  | 28 | 18.45 | −20.3262 | 3.2565 |  |  |  |
|  | 29 | 18.74 | −16.2733 | 1.5000 | TAFD25 | 1.90366 | 31.31 |
|  | 30 | 22.58 | 702.5298 | 6.2000 | SBSL7 | 1.51633 | 64.14 |
|  | 31 | 25.57 | −24.5996 | 0.5000 |  |  |  |
|  | 32 | 30.51 | −1479.2158 | 9.9416 | SFPL55 | 1.43875 | 94.66 |
|  | 33 | 33.15 | −23.8476 | 2.5000 |  |  |  |
|  | 34 | 37.76 | 64.3242 | 5.8613 | SLAM60 | 1.74320 | 49.34 |
|  | 35 | 37.62 | −335.0048 | 7.0000 |  |  |  |
| 6 | 36 | 40.00 | 1e+018 | 38.7000 | SBSL7 | 1.51633 | 64.14 |
|  | 37 | 40.00 | 1e+018 | 19.5000 | PBH56 | 1.84139 | 24.56 |
|  | 38 | 40.00 | 1e+018 | 8.0041 |  |  |  |
|  | IMG |  |  |  |  |  |  |

TABLE 2-continued

NUMERICAL EXAMPLE 2
|f| = 8.78 F = 2.40 φ = 28.50 ω = 58.4

Aspheric data surface 3 r = 6.37994e+001 K = 1.35316e+000 A = 1.56080e−005 B = −1.47629e−008
C = 1.94549e−011 D = −1.10889e−014 E = 0.00000e+000 F = 0.00000e+000
surface 4 r = 1.44160e+001 K = −5.69640e−001 A = −3.78549e−005 B = 1.28206e−007
C = −4.04978e−010 D = 9.81390e−014 E = 0.00000e+000 F = 0.00000e+000
surface 14 r = 4.45676e+001 K = −6.47274e−001 A = −7.70088e−007 B = 4.08756e−011
C = −1.17367e−013 D = 1.03873e−017 E = 0.00000e+000 F = 0.00000e+000
surface 16 r = 1.05718e+003 K = 0.00000e+000 A = −1.10339e−005 B = −8.30913e−009
C = 6.63707e−011 D = −9.81702e−014 E = 0.00000e+000 F = 0.00000e+000
surface 17 r = 1.62945e+001 K = −6.03705e−001 A = −6.77841e−005 B = 1.01013e−007
C = −1.50394e−010 D = 4.63185e−014 E = 0.00000e+000 F = 0.00000e+000
surface 19 r = −4.65320e+001 K = −1.22510e−001 A = 9.43487e−007 B = −2.43617e−011
C = 3.95374e−013 D = 6.34969e−016 E = 0.00000e+000 F = 0.00000e+000

Various data

| Projection distance | Reference | Near | Far |
|---|---|---|---|
| Focal length [mm] | 8.78 | 8.93 | 8.61 |
| F-number | 2.40 | 2.40 | 2.40 |
| Angle of view | 58.37 | 57.92 | 58.86 |
| Image height | 14.25 | 14.25 | 14.25 |
| Overall length | 371.21 | 371.21 | 371.21 |
| d 0 | 840.000 | 480.000 | 3600.000 |
| d13 | 4.066 | 5.056 | 3.000 |
| d15 | 42.640 | 42.627 | 42.657 |
| d19 | 24.408 | 22.413 | 26.554 |
| d21 | 13.138 | 14.157 | 12.041 |

| | Start | End | Focal length [mm] |
|---|---|---|---|
| B1 | 1 | 13 | 29.3449 |
| B2 | 14 | 15 | 56.6063 |
| B3 | 16 | 19 | 309.2949 |
| B4 | 20 | 21 | 103.3772 |
| B5 | 22 | 35 | 51.6874 |

Example 3

Figure 5:
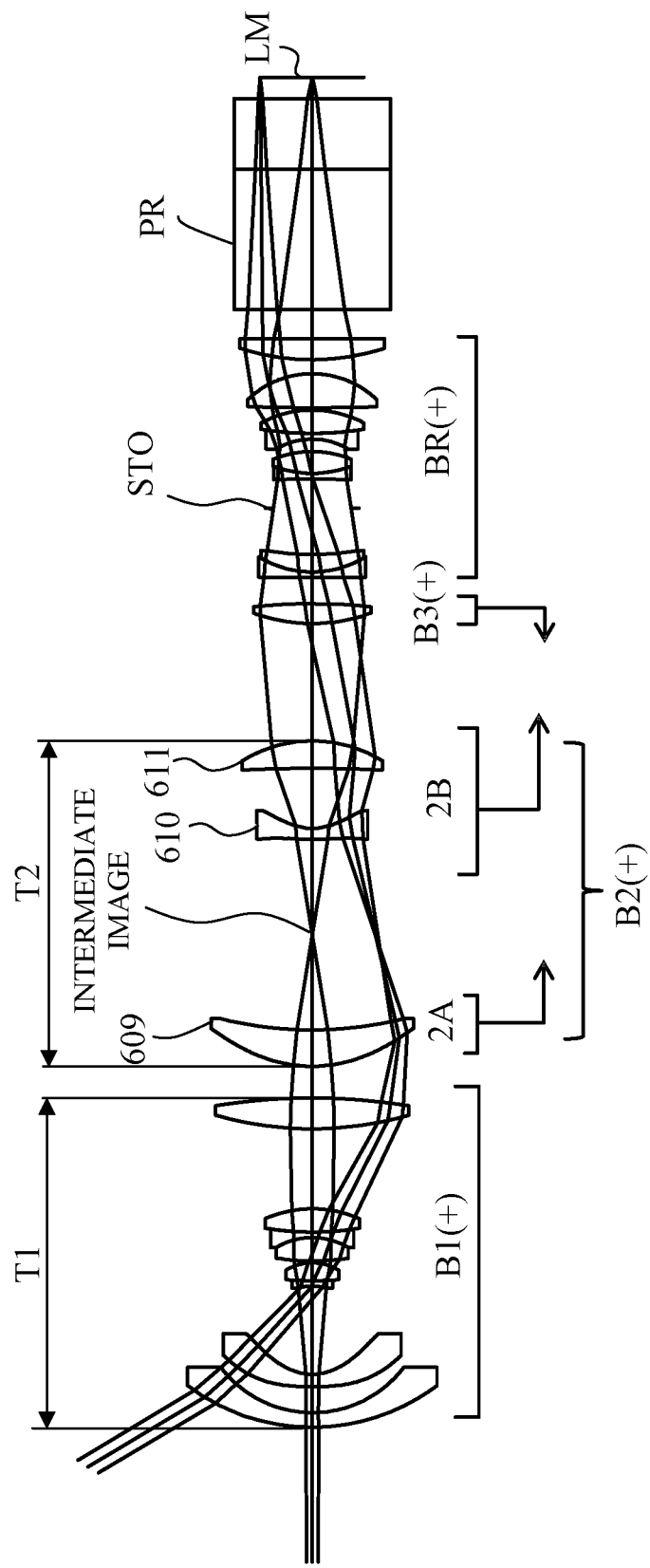
FIG. 5 is a sectional view of an imaging optical system according to example 3 of the present invention.
Figure 6A:
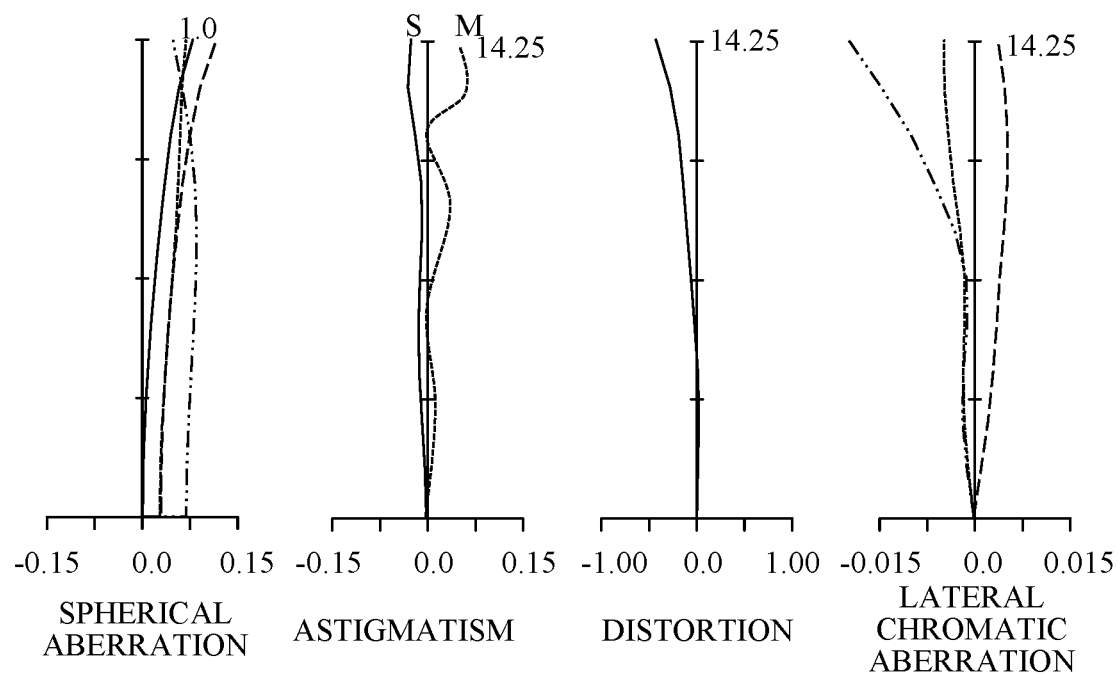
FIGS. 6A and 6B are aberration diagrams of the imaging optical system according to example 3.
Figure 6B:
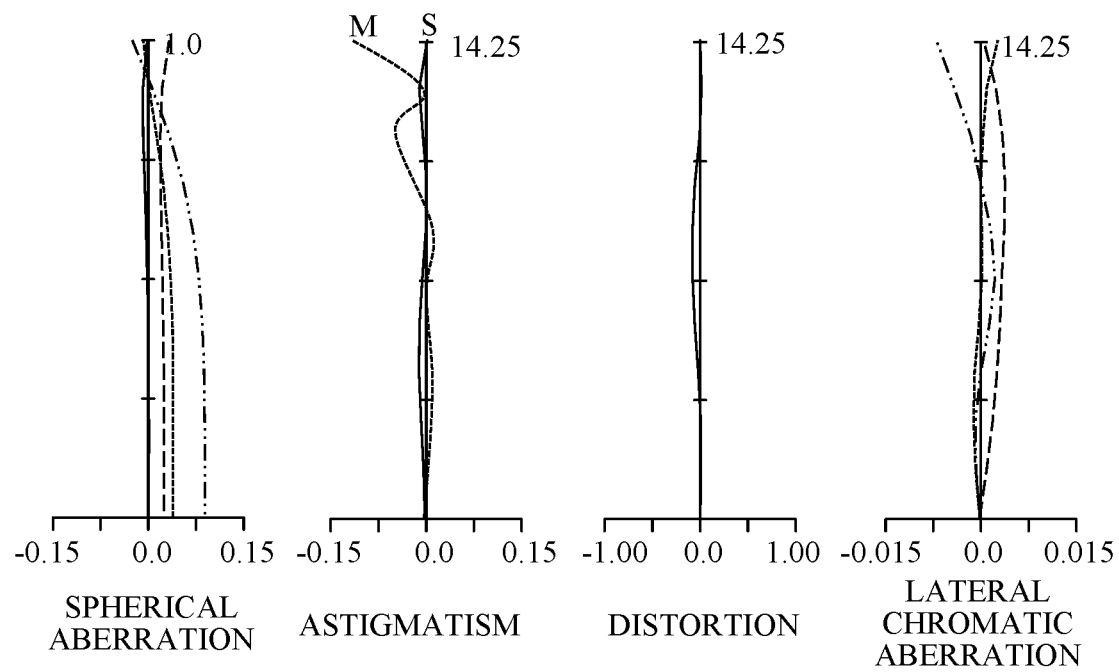

FIG. 5 illustrates a section of an imaging optical system according to example 3 (numerical example 3). Table 3 shows a variety of numerical values in the imaging optical system according to this example. FIGS. 6A and 6B illustrate a variety of aberrations showing the imaging performance when the imaging optical system according to this example focuses on a far side and a near side, respectively.

The imaging optical system according to this example is used for a projection lens having a wide angle of view, such as a half angle of view of about 59°, and as bright as an F-number of about 2.4. The imaging optical system according to this example includes a first lens unit B1 that is positive and fixed in focusing, a second lens unit B2 that is positive and moves in focusing, and a third lens unit B3 that moves in focusing. The imaging optical system further includes a fourth lens unit (final lens unit) BR fixed in focusing. The fourth lens unit BR includes a diaphragm STO.

In the imaging optical system according to this example, the second lens unit B2 moves to the reduction conjugate side and the third lens unit B3 moves to the enlargement conjugate side in focusing from the far side to the close side. However, similar to the second embodiment, in the second lens unit B2, the 2A-th lens unit on the enlargement conjugate side of the intermediate image and the 2B-th lens unit on the reduction conjugate side of the intermediate image are independently moved to the reduction conjugate side.

A moving amount of the third lens unit B3 in focusing in this example is made smaller than that in the example 2, and a distance between the 2A-th lens unit and the 2B-th lens unit is changed. A change in curvature of field as the 2B-th lens unit moves is more significant than that in the 2A-th lens unit. This configuration can provide good focusing while changing the distance between the 2A-th lens unit and the 2B-th lens unit. However, as understood from FIG. 6A, a moving amount of the third lens unit B3 may not be excessively reduced in order to prevent an adverse effect such as the spherical aberration, in the near side.

TABLE 3

| | | | NUMERICAL EXAMPLE 3 |f| = 8.42 F = 2.40 φ = 28.50 ω = 59.4 | | | |
|---|---|---|---|---|---|---|---|
| B | S | EA | R | d | glass | nd | vd |
| | OBJ | | 1e+018 | 814.00000 | | | |
| 1 | 1 | 64.68 | 56.3554 | 4.0000 | SLAL12 | 1.67790 | 55.34 |
| | 2 | 49.98 | 31.2050 | 7.1000 | | | |
| | 3* | 45.80 | 78.5644 | 3.5000 | LBAL42 | 1.58313 | 59.38 |
| | 4* | 33.71 | 13.4435 | 24.2000 | | | |
| | 5 | 8.55 | −16.7984 | 1.5000 | FDS90SG | 1.84666 | 23.78 |
| | 6 | 10.06 | 71.6405 | 5.0000 | PCD51 | 1.59349 | 67.00 |
| | 7 | 13.09 | −13.7363 | 0.5000 | | | |
| | 8 | 15.86 | 66.1095 | 6.5000 | PCD51 | 1.59349 | 67.00 |
| | 9 | 17.95 | −18.6660 | 1.4000 | FDS90SG | 1.84666 | 23.78 |
| | 10 | 20.78 | 71.4182 | 6.5000 | PCD51 | 1.59349 | 67.00 |
| | 11 | 23.59 | −31.0369 | 22.0000 | | | |
| | 12 | 49.18 | 93.2048 | 8.5000 | SNPH1W | 1.80809 | 22.76 |
| | 13 | 49.83 | −163.9735 | 8.5230 | | | |
| 2 | 14* | 52.17 | 36.2830 | 10.0000 | TAFD25 | 1.90366 | 31.31 |
| | 15 | 49.96 | 100.7872 | 52.7740 | | | |
| 3 | 16* | 27.88 | 77.6926 | 3.0000 | LBAL42 | 1.58313 | 59.38 |
| | 17* | 27.17 | 14.1781 | 16.6000 | | | |
| | 18 | 34.41 | −314.3393 | 7.5000 | SLAH55V | 1.83481 | 42.72 |
| | 19 | 35.72 | −35.8417 | 32.9060 | | | |
| 4 | 20 | 29.89 | 46.3412 | 5.5000 | SFSL5 | 1.48749 | 70.24 |
| | 21 | 29.37 | −153.2806 | 6.6970 | | | |
| 5 | 22 | 26.87 | 551.6416 | 1.5000 | SFSL5 | 1.48749 | 70.24 |
| | 23 | 25.90 | 27.3601 | 4.8000 | SNPH1W | 1.80809 | 22.76 |
| | 24 | 24.96 | 69.1086 | 12.9000 | | | |
| | s25 | 21.24 | 1e+018 | 8.0000 | | | |
| | 26 | 19.13 | −218.1221 | 1.5000 | FDS90SG | 1.84666 | 23.78 |
| | 27 | 19.03 | 29.2867 | 6.0000 | SFSL5 | 1.48749 | 70.24 |
| | 28 | 19.53 | −27.3685 | 3.5000 | | | |
| | 29 | 19.57 | −18.4841 | 1.5000 | TAFD25 | 1.90366 | 31.31 |
| | 30 | 23.14 | 86.6773 | 6.5000 | SBSL7 | 1.51633 | 64.14 |
| | 31 | 26.01 | −28.7807 | 0.5000 | | | |
| | 32 | 30.53 | 369.8007 | 9.5000 | SFPL55 | 1.43875 | 94.66 |
| | 33 | 32.75 | −25.2545 | 3.8000 | | | |
| | 34 | 36.93 | 62.2259 | 5.8000 | SLAH66 | 1.77250 | 49.60 |
| | 35 | 36.65 | 1e+013 | 8.0600 | | | |
| 6 | 36 | 40.00 | 1e+018 | 38.7000 | HK9L | 1.51680 | 64.21 |
| | 37 | 40.00 | 1e+018 | 19.5000 | PBH56 | 1.84139 | 24.56 |
| | 38 | 40.00 | 1e+018 | 5.8500 | | | |
| | 39 | 40.00 | 1e+018 | −0.0036 | | | |
| | IMG | | | | | | |

Aspheric data surface 3 r = 7.85644e+001 K = 0.00000e+000 A = 2.23482e−005 B = −2.84117e−008
C = 3.84260e−011 D = −2.47414e−014 E = 4.53056e−030 F = 0.00000e+000
surface 4 r = 1.34435e+001 K = −5.84328e−001 A = −4.57376e−005 B = 1.85652e−007
C = −6.68736e−010 D = 2.49098e−013 E = −5.05699e−031 F = 0.00000e+000
surface 14 r = 3.62830e+001 K = 0.00000e+000 A = −2.80744e−006 B = −3.10707e−010
C = −1.83015e−012 D = 1.45035e−015 E = −1.30506e−018 F = 0.00000e+000
surface 16 r = 7.76926e+001 K = 0.00000e+000 A = −4.24838e−005 B = 7.20396e−008
C = −1.15539e−010 D = 1.40383e−013 E = −1.57095e−033 F = 0.00000e+000
surface 17 r = 1.41781e+001 K = −4.28203e−001 A = −8.67428e−005 B = 3.23464e−008
C = 1.17289e−010 D = −8.48144e−013 E = −1.42200e−031 F = 0.00000e+000

TABLE 3-continued

NUMERICAL EXAMPLE 3
|f| = 8.42 F = 2.40 φ = 28.50 ω = 59.4

Various data

| Projection distance | Reference | Near | Far |
|---|---|---|---|
| Focal length [mm] | 8.42 | 8.45 | 8.39 |
| F-number | 2.40 | 2.40 | 2.40 |
| Angle of view | 59.42 | 59.34 | 59.50 |
| Image height | 14.25 | 14.25 | 14.25 |
| Overall length | 372.11 | 372.11 | 372.11 |
| d 0 | 814.000 | 465.000 | 3489.000 |
| d13 | 8.523 | 9.015 | 8.038 |
| d15 | 52.774 | 52.956 | 52.594 |
| d19 | 32.906 | 32.200 | 33.602 |
| d21 | 6.697 | 6.730 | 6.666 |

| | Start | End | Focal length [mm] |
|---|---|---|---|
| B1 | 1 | 13 | 25.4544 |
| B2 | 14 | 15 | 58.4357 |
| B3 | 16 | 19 | 464.0873 |
| B4 | 20 | 21 | 73.6580 |
| B5 | 22 | 35 | 59.9260 |

Example 4

Figure 7:
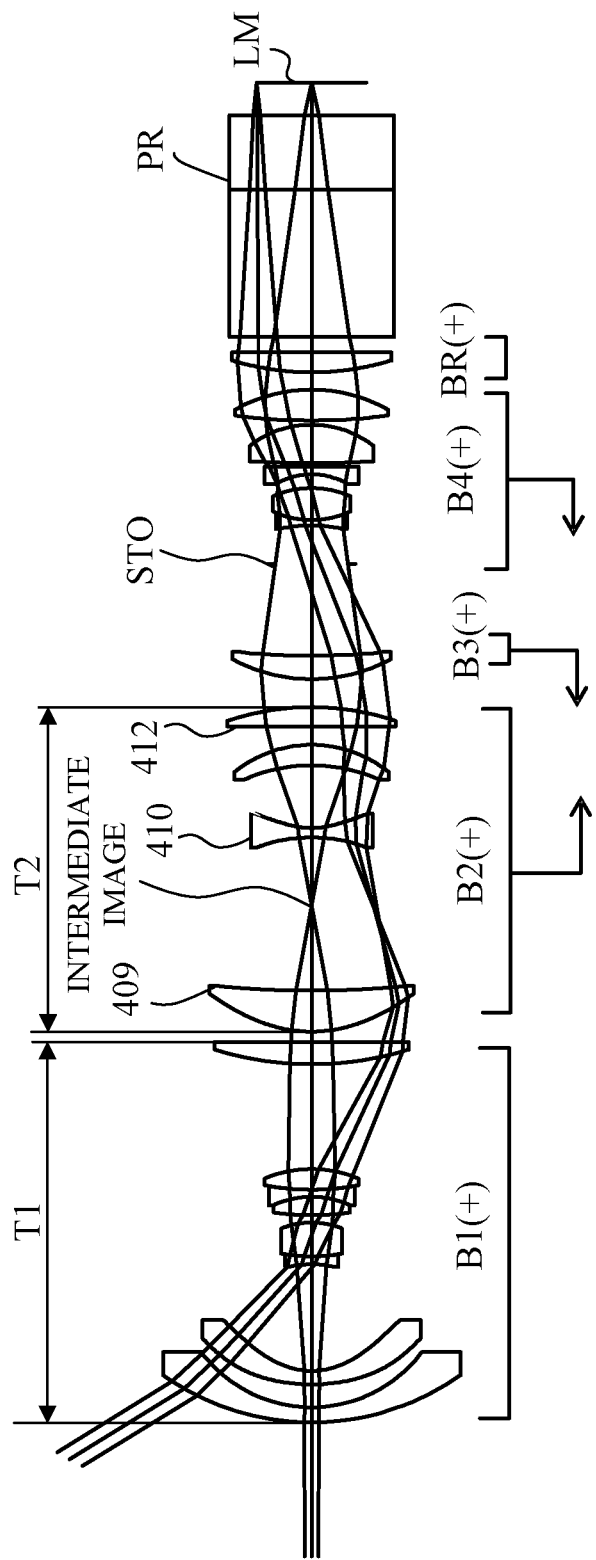
FIG. 7 is a sectional view of an imaging optical system according to example 4 of the present invention.
Figure 8A:
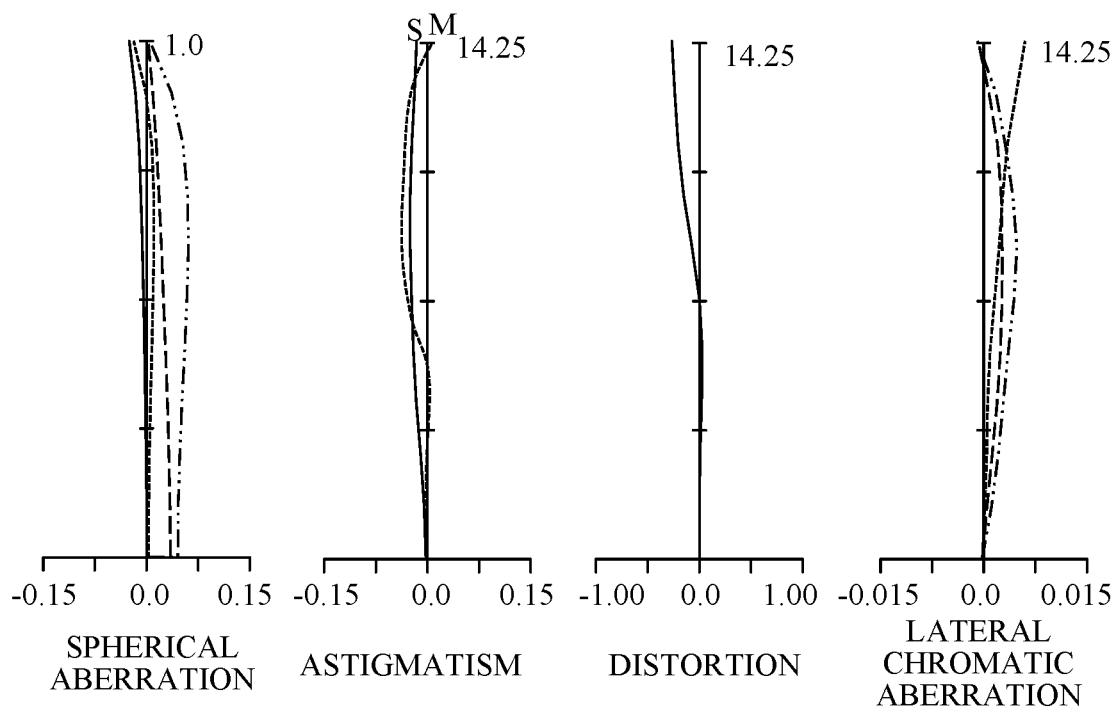
FIGS. 8A and 8B are aberration diagrams of the imaging optical system according to example 4.
Figure 8B:
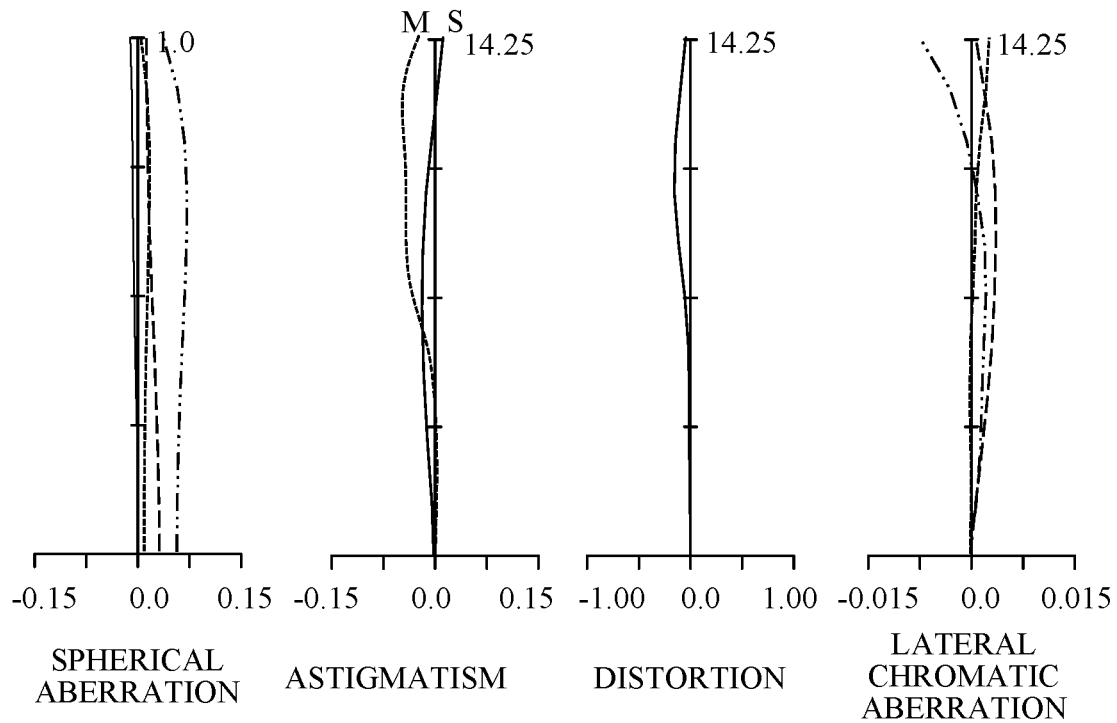

FIG. 7 illustrates a section of an imaging optical system according to example 4 (numerical example 4). Table 4 shows a variety of numerical values in the imaging optical system according to this example. FIGS. 8A and 8B illustrate a variety of aberrations showing the imaging performance when the imaging optical system according to this example focuses on a far side and a near side, respectively.

The imaging optical system according to this example is used for a projection lens having a wide angle of view, such as a half angle of view of about 58°, and as bright as an F-number of about 2.3. The imaging optical system according to this example includes a first lens unit B1 that is positive and fixed in focusing, a second lens unit B2 that is positive and moves in focusing, and a third lens unit B3 that moves in focusing. The imaging optical system further includes a fourth lens unit B4 that moves in focusing and a fifth lens unit (final lens unit) BR that is fixed in focusing. The fifth lens unit BR includes a diaphragm STO.

Even in the imaging optical system according to this example, the second lens unit B2 moves to the reduction conjugate side and the third lens unit B3 moves to the enlargement conjugate side in focusing from the far side to the near side.

As compared with the examples 1 to 3, this example adds a fourth lens unit moving to the reduction conjugate side B4 between the third lens unit B3 moving to the reduction conjugate side in focusing and the final lens unit BR fixed in focusing. More lens units moving in focusing can easily independently control the aberration in each lens unit.

TABLE 4

NUMERICAL EXAMPLE 4
|f| = 8.79 F = 2.30 φ = 28.50 ω = 58.3

| B | S | EA | R | d | glass | nd | vd |
|---|---|---|---|---|---|---|---|
| | OBJ | | | 844.00000 | | | |
| 1 | 1 | 73.35 | 65.7675 | 4.0000 | SLAL14 | 1.69680 | 55.53 |
| | 2 | 57.12 | 35.4636 | 6.0000 | | | |
| | 3* | 53.35 | 49.7112 | 3.5000 | LLAH53 | 1.80625 | 40.91 |
| | 4* | 43.07 | 18.0000 | 27.9319 | | | |
| | 5 | 12.58 | −25.0000 | 2.0000 | FDS90SG | 1.84666 | 23.78 |
| | 6 | 11.14 | 42.8178 | 8.8278 | PCD4 | 1.61800 | 63.39 |
| | 7 | 14.34 | −21.0150 | 2.0000 | | | |
| | 8 | 16.91 | 79.4301 | 4.7766 | PCD4 | 1.61800 | 63.39 |
| | 9 | 17.97 | −23.0000 | 1.8000 | FDS90SG | 1.84666 | 23.78 |
| | 10 | 20.43 | 58.6068 | 5.5148 | PCD4 | 1.61800 | 63.39 |
| | 11 | 22.26 | −30.2970 | 27.3884 | | | |
| | 12 | 47.10 | 84.7195 | 5.8394 | SNPH1 | 1.80809 | 22.76 |
| | 13 | 47.43 | 1e+018 | 2.7247 | | | |
| 2 | 14* | 50.05 | 35.0182 | 10.6265 | FDS90SG | 1.84666 | 23.78 |
| | 15 | 48.56 | 240.8730 | 40.0648 | | | |
| | 16* | 28.43 | −50.0000 | 2.5000 | LBAL42 | 1.58313 | 59.38 |
| | 17* | 29.14 | 19.7594 | 16.3862 | | | |
| | 18 | 35.05 | −43.0184 | 5.4123 | SLAH53 | 1.80610 | 40.93 |
| | 19 | 37.35 | −31.4626 | 4.7117 | | | |
| | 20 | 40.61 | 1e+018 | 5.1806 | SLAH53 | 1.80610 | 40.93 |
| | 21 | 40.97 | −67.5430 | 7.2671 | | | |
| 3 | 22 | 38.40 | 42.6261 | 6.1597 | SNBH56 | 1.85478 | 24.80 |
| | 23 | 37.02 | 188.7726 | 23.8947 | | | |

TABLE 4-continued

NUMERICAL EXAMPLE 4
|f| = 8.79 F = 2.30 φ = 28.50 ω = 58.3

| | | | | | | | |
|---|---|---|---|---|---|---|---|
| 4 | s24 | 18.94 | 1e+018 | 10.0979 | | | |
| | 25 | 16.46 | −42.1638 | 1.5000 | FD60W | 1.80518 | 25.46 |
| | 26 | 16.73 | 23.5173 | 8.3979 | SFSL5 | 1.48749 | 70.24 |
| | 27 | 18.26 | −24.2640 | 3.5477 | | | |
| | 28 | 18.78 | −18.3332 | 2.0000 | STIM28 | 1.68893 | 31.07 |
| | 29 | 22.30 | 1e+018 | 1.0000 | | | |
| | 30 | 24.57 | 344.1939 | 9.9962 | SFPL55 | 1.43875 | 94.66 |
| | 31 | 29.78 | −25.7273 | 1.0429 | | | |
| | 32 | 35.87 | 144.7302 | 8.0975 | SFPM3 | 1.53775 | 74.70 |
| | 33 | 36.97 | −40.3564 | 4.5166 | | | |
| 5 | 34* | 38.69 | 65.9354 | 5.2961 | MPCD4 | 1.61881 | 63.85 |
| | 35 | 38.38 | −6705.4987 | 4.0000 | | | |
| 6 | 36 | 40.00 | 1e+018 | 38.5000 | SBSL7 | 1.51633 | 64.14 |
| | 37 | 40.00 | 1e+018 | 19.5000 | SF6 | 1.80518 | 25.43 |
| | 38 | 40.00 | 1e+018 | 8.5065 | | | |
| | IMG | | | | | | |

Aspheric data surface 3 r = 4.97112e+001 K = 0.00000e+000 A = 5.14563e−006 B = −4.31485e−010
C = 3.21002e−012 D = −4.18790e−015 E = 8.09777e−019 F = 0.00000e+000
surface 4 r = 1.80000e+001 K = −6.28478e−001 A = −1.70995e−005 B = 2.11187e−008
C = 1.82247e−011 D = −1.86998e−013 E = 1.53461e−016 F = 0.00000e+000
surface 14 r = 3.50182e+001 K = 0.00000e+000 A = −3.26127e−006 B = −1.22846e−009
C = 1.99537e−012 D = −7.84711e−015 E = 9.12634e−018 F = −4.61432e−021
surface 16 r = −5.00000e+001 K = 0.00000e+000 A = −2.15738e−005 B = 5.35155e−008
C = −5.60339e−011 D = 4.62602e−014 E = 3.28476e−031 F = 5.51725e−036
surface 17 r = 1.97594e+001 K = 0.00000e+000 A = −7.74211e−005 B = 1.59385e−007
C = −4.18206e−010 D = 4.41204e−013 E = −9.52763e−028 F = −1.65042e−018
surface 34 r = 6.59354e+001 K = 0.00000e+000 A = −6.87581e−007 B = −6.99828e−010
C = 1.95465e−012 D = −9.53152e−015 E = 1.62150e−017 F = −1.24616e−020

Various data

| Projection distance | Reference | Near | Far |
|---|---|---|---|
| Focal length [mm] | 8.79 | 8.95 | 8.66 |
| F-number | 2.30 | 2.30 | 2.30 |
| Angle of view | 58.34 | 57.85 | 58.72 |
| Image height | 14.25 | 14.25 | 14.25 |
| Overall length | 350.51 | 350.51 | 350.51 |
| d 0 | 844.000 | 420.000 | 3600.000 |
| d13 | 2.725 | 3.597 | 2.000 |
| d21 | 7.267 | 5.562 | 8.673 |
| d23 | 23.895 | 24.182 | 23.731 |
| d33 | 4.517 | 5.062 | 4.000 |

| | Start | End | Focal length [mm] |
|---|---|---|---|
| B1 | 1 | 13 | 26.5359 |
| B2 | 14 | 21 | 101.8708 |
| B3 | 22 | 23 | 63.1859 |
| B4 | 24 | 33 | 140.8355 |
| B5 | 34 | 35 | 105.5470 |

Example 5

Figure 9:
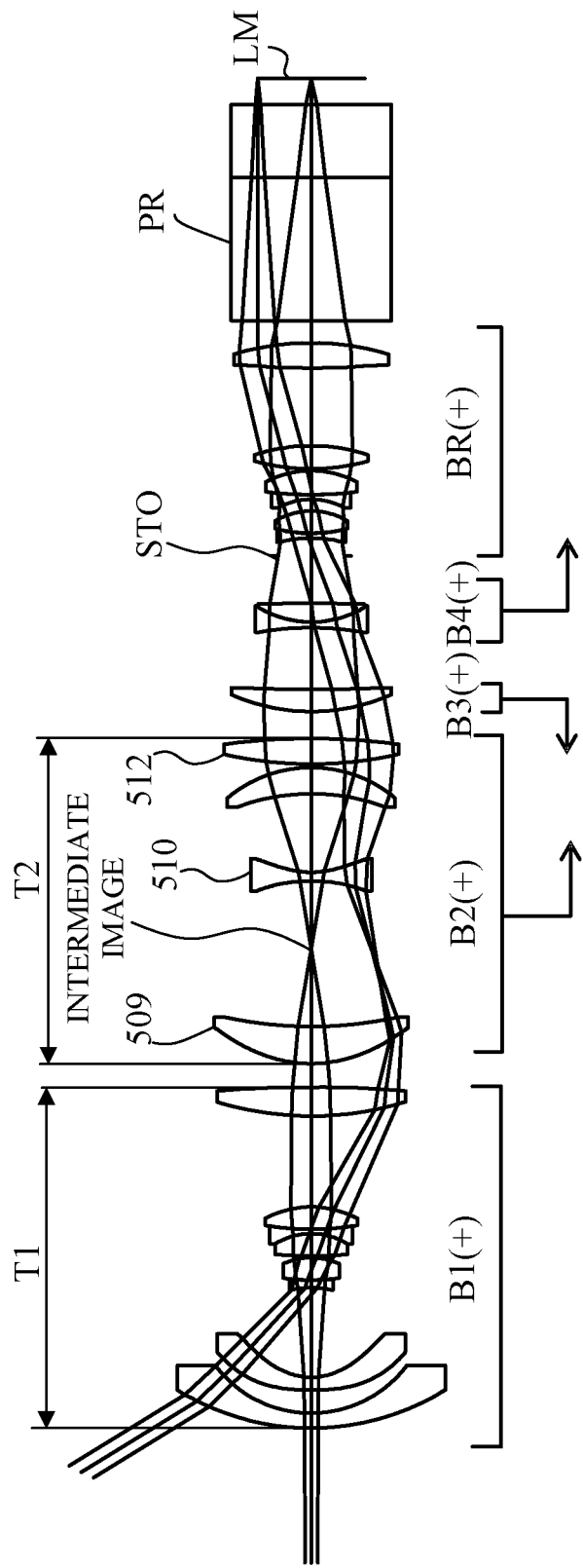
FIG. 9 is a sectional view of an imaging optical system according to example 5 of the present invention.
Figure 10A:
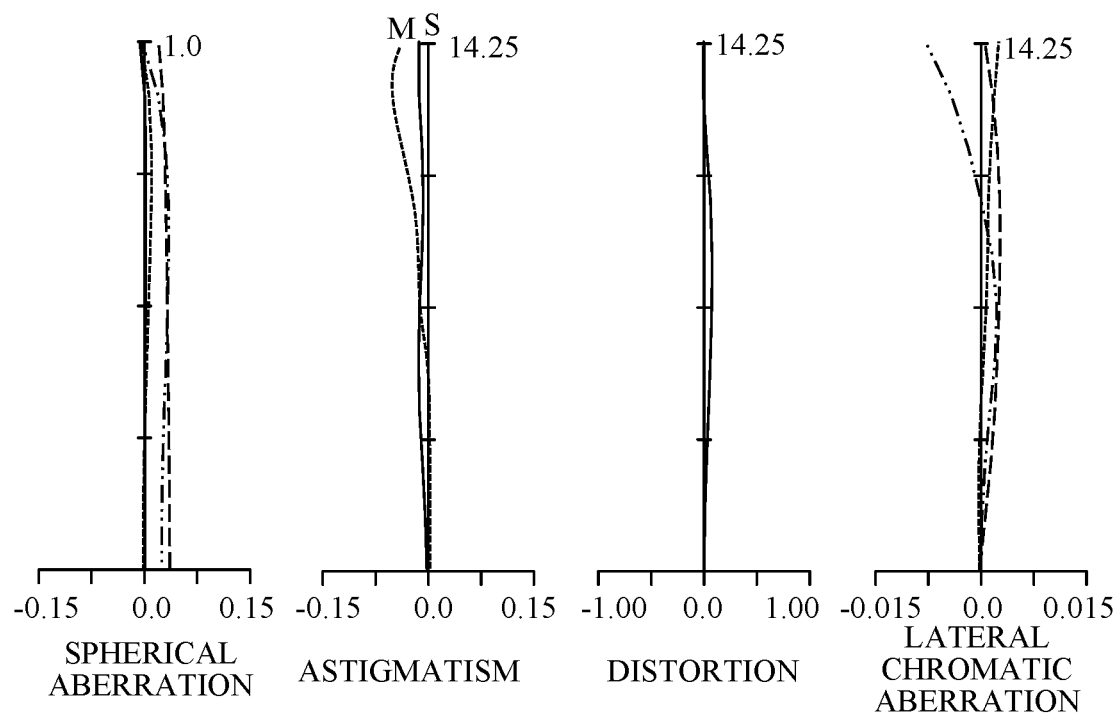
FIGS. 10A and 10B are aberration diagrams of the imaging optical system according to example 5.
Figure 10B:
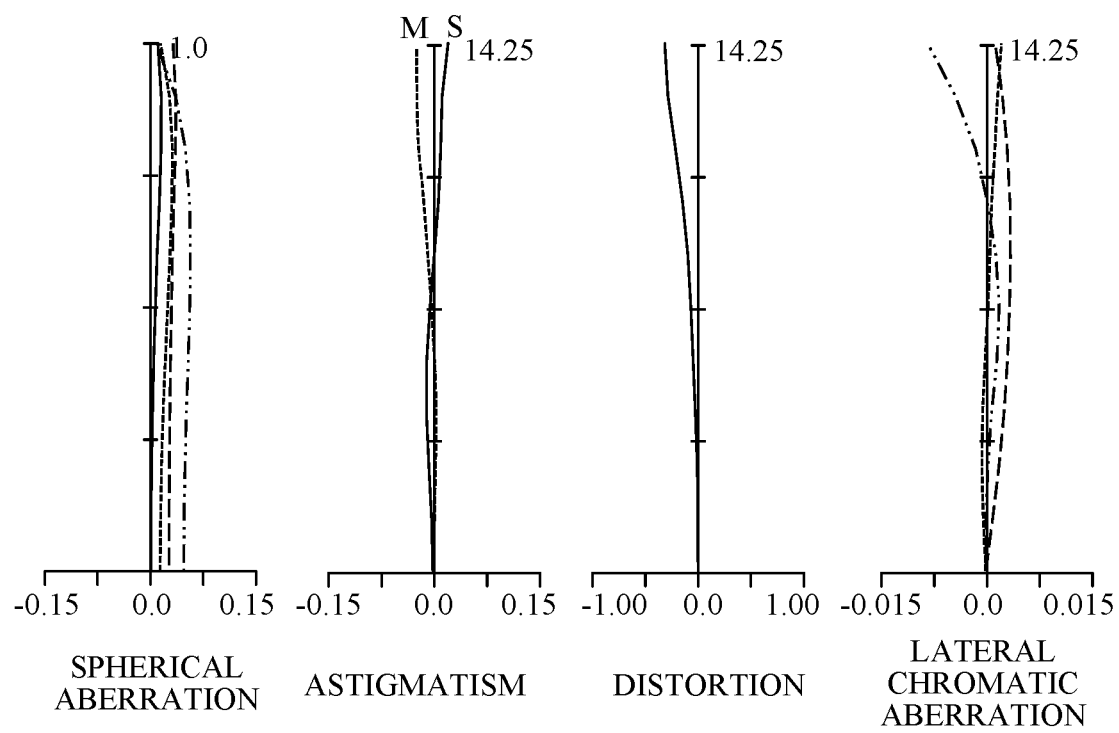

FIG. 9 illustrates a section of an imaging optical system according to example 5 (numerical example 5). Table 5 shows a variety of numerical values of the imaging optical system according to this example. FIGS. 10A and 10B illustrate a variety of aberrations showing the imaging performance when the imaging optical system according to this example focuses on a far side and a near side, respectively.

The imaging optical system according to this example is used as a projection lens having a wide angle of view, such as a half angle of view of about 58°, and as bright as an F-number of about 2.4. The imaging optical system according to this example is a numerical modification of the imaging optical system according to the example 4, and more lens units moving in focusing as in the example 4 can easily and independently control the aberration occurring in each lens unit.

TABLE 5

NUMERICAL EXAMPLE 5
|f| = 8.79 F = 2.40 φ = 28.50 ω = 58.3

| B | S | EA | R | d | glass | nd | vd |
|---|---|----|---|---|-------|-----|-----|
|   | OBJ |   | 1e+018 | 840.00000 |  |  |  |
| 1 | 1 | 67.80 | 67.2868 | 4.0000 | SBSM14 | 1.60311 | 60.64 |
|   | 2 | 51.00 | 31.7363 | 6.1984 |  |  |  |
|   | 3* | 47.21 | 66.6012 | 3.5000 | LBAL42 | 1.58313 | 59.38 |
|   | 4* | 36.70 | 16.0905 | 24.1570 |  |  |  |
|   | 5 | 10.42 | −21.6111 | 2.0000 | FDS90SG | 1.84666 | 23.78 |
|   | 6 | 9.75 | 46.3140 | 6.0000 | PCD4 | 1.61800 | 63.39 |
|   | 7 | 13.59 | −18.2290 | 0.5000 |  |  |  |
|   | 8 | 15.77 | 100.1910 | 6.0000 | PCD4 | 1.61800 | 63.39 |
|   | 9 | 17.59 | −18.0000 | 1.2000 | FDS90SG | 1.84666 | 23.78 |
|   | 10 | 20.34 | 76.7482 | 6.0000 | PCD4 | 1.61800 | 63.39 |
|   | 11 | 22.57 | −25.3834 | 24.3094 |  |  |  |
|   | 12 | 46.96 | 84.7006 | 7.8000 | SNPH4 | 1.89286 | 20.36 |
|   | 13 | 47.39 | −299.7774 | 6.6006 |  |  |  |
| 2 | 14* | 48.74 | 34.3078 | 10.0000 | TAFD25 | 1.90366 | 31.31 |
|   | 15 | 46.42 | 108.5053 | 38.9335 |  |  |  |
|   | 16* | 28.92 | −45.8444 | 2.3000 | LBAL42 | 1.58313 | 59.38 |
|   | 17* | 29.82 | 20.8392 | 21.3611 |  |  |  |
|   | 18 | 39.39 | −54.7334 | 7.0000 | SNBH51 | 1.74950 | 35.33 |
|   | 19 | 41.93 | −34.2084 | 0.5000 |  |  |  |
|   | 20 | 43.80 | 100.0195 | 7.0000 | SLAM2 | 1.74400 | 44.79 |
|   | 21 | 43.58 | −155.0659 | 6.7469 |  |  |  |
| 3 | 22 | 39.91 | 51.7842 | 6.0000 | SFSL5 | 1.48749 | 70.24 |
|   | 23 | 38.75 | 468.1203 | 16.6365 |  |  |  |
| 4 | 24 | 27.61 | −75.0184 | 1.5000 | SBSL7 | 1.51633 | 64.14 |
|   | 25 | 26.00 | 27.5377 | 5.0000 | SNBH56 | 1.85478 | 24.80 |
|   | 26 | 25.45 | −508.4876 | 12.8299 |  |  |  |
| 5 | s27 | 17.63 | 1e+018 | 4.8492 |  |  |  |
|   | 28 | 16.38 | −30.1359 | 1.2000 | FDS90SG | 1.84666 | 23.78 |
|   | 29 | 16.66 | 36.7551 | 6.0000 | SFSL5 | 1.48749 | 70.24 |
|   | 30 | 17.39 | −18.4139 | 3.1618 |  |  |  |
|   | 31 | 17.22 | −18.2204 | 1.2000 | FDS90SG | 1.84666 | 23.78 |
|   | 32 | 19.27 | 88.8761 | 6.5000 | SFSL5 | 1.48749 | 70.24 |
|   | 33 | 22.35 | −25.5109 | 0.5000 |  |  |  |
|   | 34 | 26.95 | 58.4978 | 6.2486 | SFPL55 | 1.43875 | 94.66 |
|   | 35 | 28.16 | −46.6421 | 21.3852 |  |  |  |
|   | 36* | 38.44 | 159.9421 | 6.8000 | TAFD25 | 1.90366 | 31.31 |
|   | 37 | 38.98 | −68.9764 | 6.0000 |  |  |  |
| 6 | 38 | 40.00 | 1e+018 | 38.5000 | SBSL7 | 1.51633 | 64.14 |
|   | 39 | 40.00 | 1e+018 | 19.5000 | PBH56 | 1.84139 | 24.56 |
|   | 40 | 40.00 | 1e+018 | 7.0054 |  |  |  |
|   | IMG |  |  |  |  |  |  |

Aspheric data surface 3 r = 6.66012e+001 K = 0.00000e+000 A = 1.80218e−005 B = −1.57241e−008
C = 1.99178e−011 D = −9.50319e−015 E = 0.00000e+000 F = 0.00000e+000 surface 4 r = 1.60905e+001 K = −4.97690e−001 A = −2.55125e−005 B = 9.10791e−008
C = −2.80591e−010 D = 4.55201e−014 E = 0.00000e+000 F = 0.00000e+000 surface 14 r = 3.43078e+001 K = −3.85022e−001 A = −2.07580e−006 B = 4.50039e−011
C = −2.70885e−013 D = −1.45048e−016 E = 0.00000e+000 F = 0.00000e+000 surface 16 r = −4.58444e+001 K = 0.00000e+000 A = −1.10911e−005 B = −9.13527e−010
C = 1.28598e−010 D = −2.37027e−013 E = 0.00000e+000 F = 0.00000e+000

TABLE 5-continued

NUMERICAL EXAMPLE 5
|f| = 8.79 F = 2.40 φ = 28.50 ω = 58.3 surface 17 r = 2.08392e+001 K = 0.00000e+000 A = −6.77610e−005 B = 1.09408e−007
C = −1.50355e−010 D = −9.20233e−014 E = 0.00000e+000 F = 0.00000e+000
surface 36 r = 1.59942e+002 K = 0.00000e+000 A = −1.67195e−006 B = −1.10730e−010
C = −6.42328e−013 D = 0.00000e+000 E = 0.00000e+000 F = 0.00000e+000

Various data

| Projection distance | Reference | Near | Far |
|---|---|---|---|
| Focal length [mm] | 8.79 | 8.93 | 8.61 |
| F-number | 2.40 | 2.40 | 2.40 |
| Angle of view | 58.33 | 57.93 | 58.86 |
| Image height | 14.25 | 14.25 | 14.25 |
| Overall length | 362.93 | 362.93 | 362.93 |
| d 0 | 840.000 | 480.000 | 3600.000 |
| d13 | 6.601 | 7.102 | 6.062 |
| d21 | 6.747 | 4.664 | 9.469 |
| d23 | 16.637 | 18.522 | 14.036 |
| d26 | 12.830 | 12.527 | 13.246 |
| d37 | 6.000 | 6.000 | 6.000 |

| | Start | End | Focal length [mm] |
|---|---|---|---|
| B1 | 1 | 13 | 22.9139 |
| B2 | 14 | 21 | 131.1935 |
| B3 | 22 | 23 | 118.8773 |
| B4 | 24 | 26 | 139.6854 |
| B5 | 27 | 37 | 40.5940 |

Table 6 summarizes the numerical values of the conditional expressions (1) and (2) in the examples 1 to 5. T1 is a thickness of the first lens unit B1, and T2 is a thickness of the second lens unit B2. The examples 2 and 3 divide the second lens unit B2 into the 2A-th lens unit and the 2B-th lens unit, but T2 used herein represents a distance from a starting surface of the 2A-th lens unit to the final surface of the 2B-th lens unit. r1 is a radius of curvature of a lens surface on the enlargement conjugate side of the negative lens 110 located on the reduction conjugate side of the intermediate image, and r2 is a radius of curvature of a lens surface on the reduction conjugate side of the negative lens 110. $sf(=(r1+r2)/(r1-r2))$ is a shape factor of the negative lens 110.

TABLE 6

| | Example 1 | Example 2 | Example 3 | Example 4 | Example 5 |
|---|---|---|---|---|---|
| T1 | 90.700 | 97.046 | 90.700 | 99.579 | 91.665 |
| T2 | 89.750 | 93.760 | 89.750 | 84.882 | 87.095 |
| T2/T1 | 0.990 | 0.966 | 0.990 | 0.852 | 0.950 |
| R1 | 77.693 | 1057.182 | 77.693 | −50.000 | −45.844 |
| R2 | 14.178 | 16.295 | 14.178 | 19.759 | 20.839 |
| sf | 1.446 | 1.031 | 1.446 | 0.433 | 0.375 |

The imaging optical system according to each of the above examples has a high resolving power, a wide angle of view, and a good imaging performance from a far side to a near side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the imaging optical system according to each of the above examples may be used for a projection optical system or as an imaging optical system.

This application claims the benefit of Japanese Patent Application No. 2018-012817, filed on Jan. 29, 2018, which is hereby incorporated by reference herein in its entirety.

What is claimed is:

1. An imaging optical system comprising in order from an enlargement conjugate side to a reduction conjugate side:
   a first lens unit having a positive refractive power;
   a second lens unit having a positive refractive power; and
   a third lens unit having a positive refractive power,
   wherein a distance between the second lens unit and the third lens unit varies in focusing from a far side to a near side,
   wherein an intermediate image is formed inside the second lens unit,
   wherein in focusing from the far side to the near side, the second lens unit moves to the reduction conjugate side, and the third lens unit moves to the enlargement conjugate side, and
   wherein the third lens unit consists of a single lens having a convex shape on the enlargement conjugate side.

2. The imaging optical system according to claim 1, wherein the following condition is satisfied:

$$0.4 \leq T1/T2 \leq 2.0$$

where T1 is a distance between a lens surface closest to the enlargement conjugate side and a lens surface closest to the reduction conjugate side in the first lens unit, and T2 is a distance between a lens surface closest to the enlargement conjugate side and a lens surface closest to the reduction conjugate side in the second lens unit.

3. The imaging optical system according to claim 1, wherein the second lens unit includes a negative lens closest to the reduction conjugate side of the intermediate image, and the following condition is satisfied:

$$0 < sf \leq 3$$

where r1 is a radius of curvature of a lens surface of the negative lens on the enlargement conjugate side, r2 is a radius of curvature of a lens surface of the negative lens on the reduction conjugate side, and sf=(r1+r2)/(r1-r2).

4. The imaging optical system according to claim 1, wherein the second lens unit includes a 2A-th lens unit on the enlargement conjugate side of the intermediate image and a 2B-th lens unit on the reduction conjugate side of the intermediate image, and
   wherein the 2A-th lens unit and the 2B-th lens unit independently move to the reduction conjugate side in focusing from the far side to the near side.

5. The imaging optical system according to claim 1, wherein the second lens unit includes:
   an aspherical lens having a surface on the enlargement conjugate side with a convex shape on the enlargement conjugate side and a positive refractive power,
   an aspherical lens having a negative refractive power, and
   an aspheric lens having a surface on the reduction conjugate side with a convex shape on the reduction conjugate side and a positive refracting power.

6. The imaging optical system according to claim 1, further comprising a fourth lens unit disposed on the reduction conjugate side of the third lens unit and configured to move to the enlargement conjugate side or the reduction conjugate side in focusing from the far side to the near side.

7. An image projection apparatus comprising:
   an imaging optical system that includes, in order from an enlargement conjugate side to a reduction conjugate side, a first lens unit having a positive refractive power, a second lens unit having a positive refractive power, and a third lens unit having a positive refractive power, wherein a distance between the second lens unit and the third lens unit varies in focusing from a far side to a near side, an intermediate image is formed inside the second lens unit, in focusing from the far side to the near side, the second lens unit moves to the reduction conjugate side, and the third lens unit moves to the enlargement conjugate side, and the third lens unit consists of a single lens having a convex shape on the enlargement conjugate side; and
   a light modulation element disposed on the reduction conjugate side of the imaging optical system,
   wherein the imaging optical system is a projection optical system configured to project light from the reduction conjugate side onto a surface on the enlargement conjugate side.

* * * * *